Sept. 27, 1960 D. M. SCHWARTZ ET AL 2,953,942
TRANSMISSION
Filed April 27, 1959 7 Sheets-Sheet 1

INVENTORS.
DANIEL M. SCHWARTZ
ERNEST M. MARTIN

BY Harold T. Stowell
Harold L. Stowell
ATTORNEYS.

Sept. 27, 1960 D. M. SCHWARTZ ET AL 2,953,942
TRANSMISSION
Filed April 27, 1959 7 Sheets-Sheet 2

INVENTORS.
DANIEL M. SCHWARTZ
ERNEST M. MARTIN

BY Harold T. Stowell
Harold L. Stowell
ATTORNEY

Sept. 27, 1960 D. M. SCHWARTZ ET AL 2,953,942
TRANSMISSION
Filed April 27, 1959 7 Sheets-Sheet 4

INVENTORS.
DANIEL M. SCHWARTZ
ERNEST M. MARTIN

BY Harold T. Stowell
Harold L. Stowell
ATTORNEYS

Sept. 27, 1960  D. M. SCHWARTZ ET AL  2,953,942
TRANSMISSION
Filed April 27, 1959  7 Sheets-Sheet 5

INVENTORS.
DANIEL M. SCHWARTZ
ERNEST M. MARTIN

BY Harold T. Stowell
Harold L. Stowell
ATTORNEYS.

Sept. 27, 1960  D. M. SCHWARTZ ET AL  2,953,942
TRANSMISSION

Filed April 27, 1959  7 Sheets-Sheet 6

INVENTORS.
DANIEL M. SCHWARTZ
ERNEST M. MARTIN

BY Harold T. Stowell
Harold L. Stowell
ATTORNEYS.

Sept. 27, 1960  D. M. SCHWARTZ ET AL  2,953,942
TRANSMISSION
Filed April 27, 1959  7 Sheets-Sheet 7

INVENTORS.
DANIEL M. SCHWARTZ
ERNEST M. MARTIN
BY Harold T. Stowell
Harold L. Stowell
ATTORNEYS.

United States Patent Office

2,953,942
Patented Sept. 27, 1960

2,953,942

TRANSMISSION

Daniel M. Schwartz and Ernest M. Martin, Salt Lake City, Utah, assignors to The Eimco Corporation, Salt Lake City, Utah, a corporation of Delaware Filed Apr. 27, 1959, Ser. No. 809,258

6 Claims. (Cl. 74—665)

This invention relates to power transmitting means and, more particularly, to a multiple speed reversible transmission with paired power output shafts.

Many multiple speed reversing transmissions have been designed and built and many are well known in the art; however, low speed of response in shifting, excessive wear of clutching surfaces and high inertia problems are encountered in the prior art transmissions with the changes in gear rotation during change speed and reverse shifting.

It is, therefore, a major object of the present invention to provide a constant mesh four-speed reversing tranmission in which, with no reversal of direction of rotation of the input shaft, there is no reversal of rotation of any of the gears of the transmission.

Another object is to provide a constant mesh multiple speed reversing transmission having an input shaft with two relatively rotatable gears and clutch means mounted thereon providing a choice of two gear speed power drives to a countershaft.

A further object is to provide a constant mesh four-speed reversing transmission having a single power input shaft and dual power output shafts with each of the output shafts having independent reversing and neutral control.

A further object is to provide an improved constant mesh change speed and reverse transmission having an input shaft, a pair of intermediate shafts and at least one output shaft with the input shaft and the output shaft interconnected by constant mesh gearing through the intermediate shafts in serial succession.

It is a further object to provide such a transmission wherein the input shaft and the second in series of the intermediate shafts have gears rotatably mounted thereon and clutch means on said shafts for selectively coupling the gears thereto.

Another object is to provide a transmission which is very compact, sturdy in construction and versatile in application.

These and other objects and advantages of the present invention are provided in a transmission including a power input shaft, a power output shaft, and a plurality of intermediate shafts, means connecting the input shaft with the output shaft through the intermediate shafts in serial succession, the connecting means including change speed gears rotatably mounted on the input shaft, change speed gears fixed on the first in series of the intermediate shafts and meshing with the rotatably mounted gears on the input shaft, change speed gear sets between each of the intermediate shafts, direction changing gear sets between the last in series of the intermediate shafts and the output shaft, and clutch means on at least the input shaft and the output shaft for establishing drive through selected gear means and gear sets.

Certain of the subject matter of this application is disclosed in co-pending application Serial No. 497,132, filed March 28, 1955, by D. M. Schwartz et al. which application is a continuation-in-part of application Serial No. 377,125, filed August 28, 1953, and now U.S. Patent 2,843,213.

Further objects and advantages will appear from the following description and appended claims when read in conjunction with the attached drawings wherein:

Figure 1:
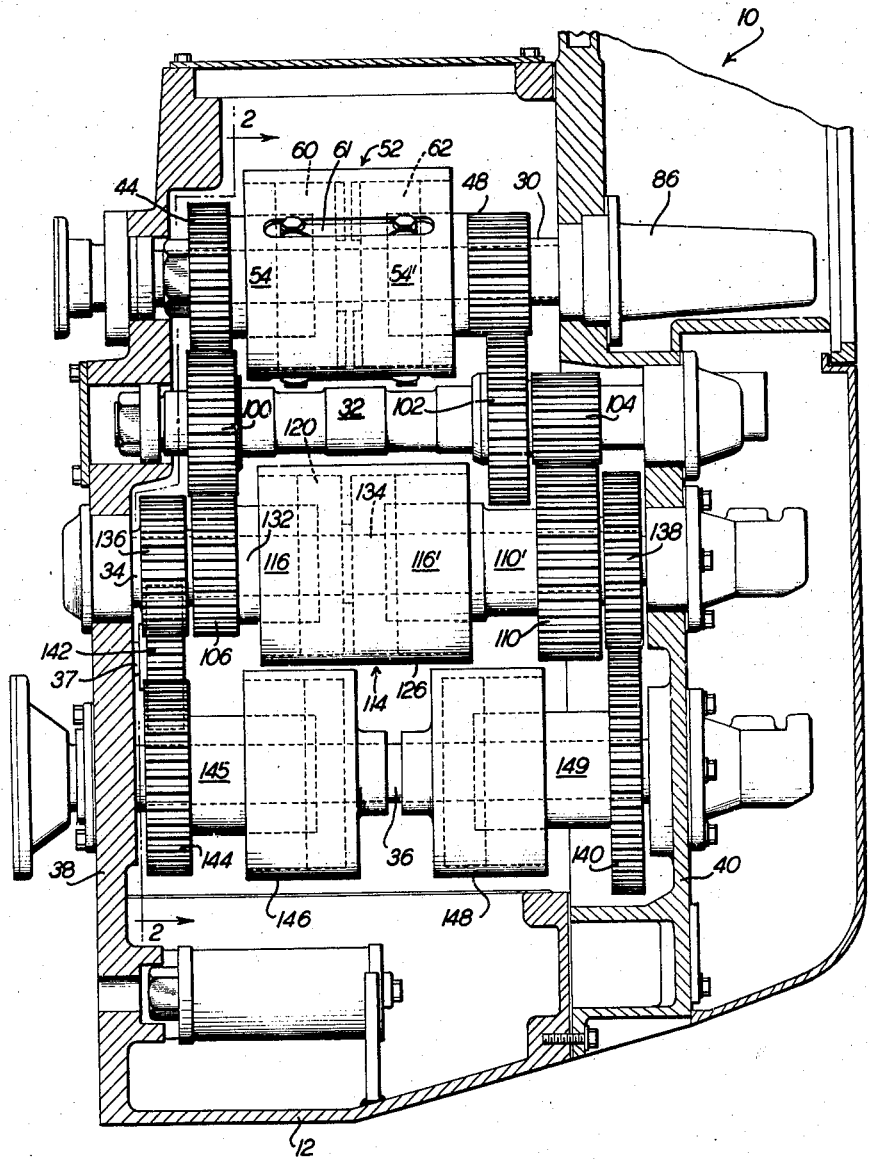
Fig. 1 is a sectional view in elevation showing a transmission constructed in accordance with the principles of the invention substantially on line 1—1 of Fig. 2.
Figure 2:
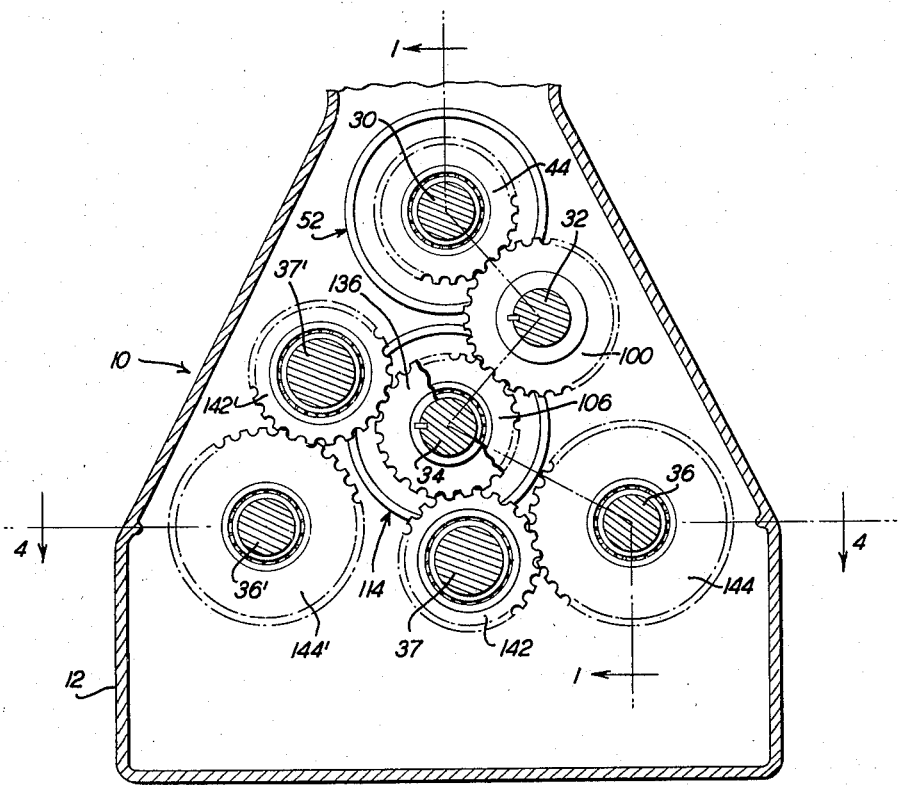
Fig. 2 is a cut-away and sectional view on line 2—2 of Fig. 1.
Figure 3:
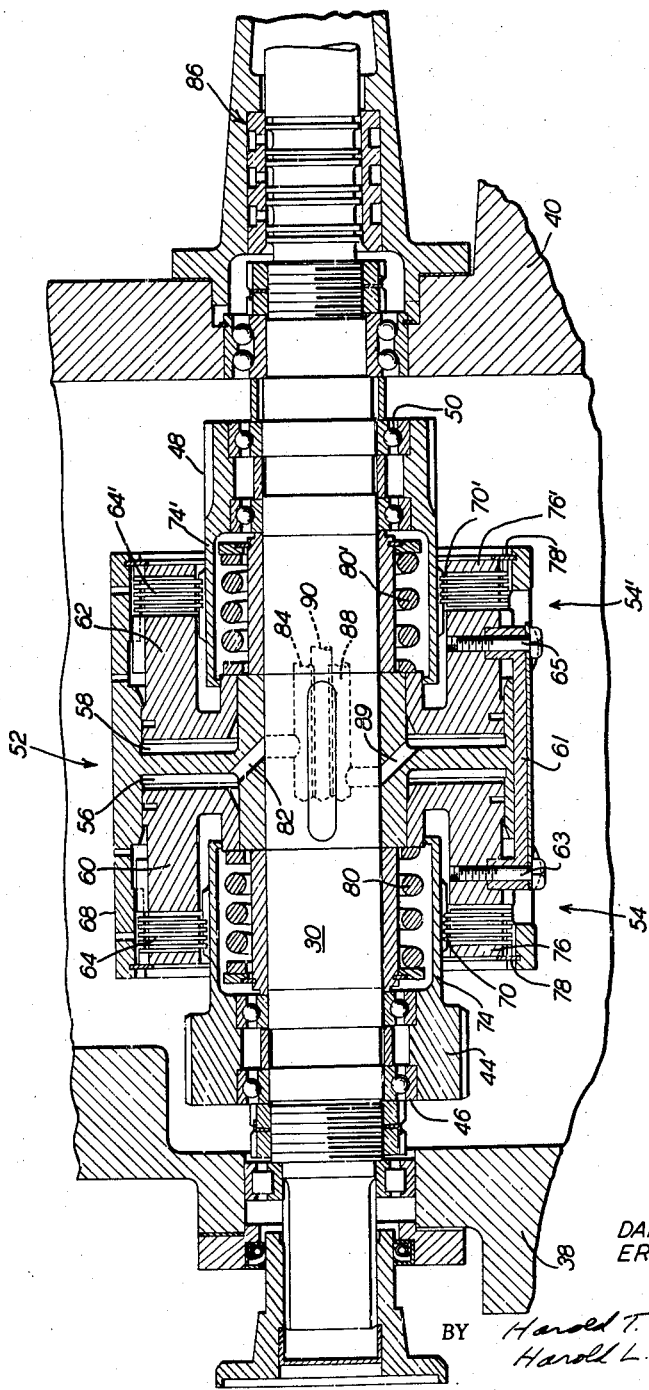
Fig. 3 is an enlarged detailed cut-away and sectioned view showing the input shaft of the transmission illustrated in Fig. 1 including details of the dual clutch means for selectively coupling the input shaft gears to the input shaft.
Figure 4:
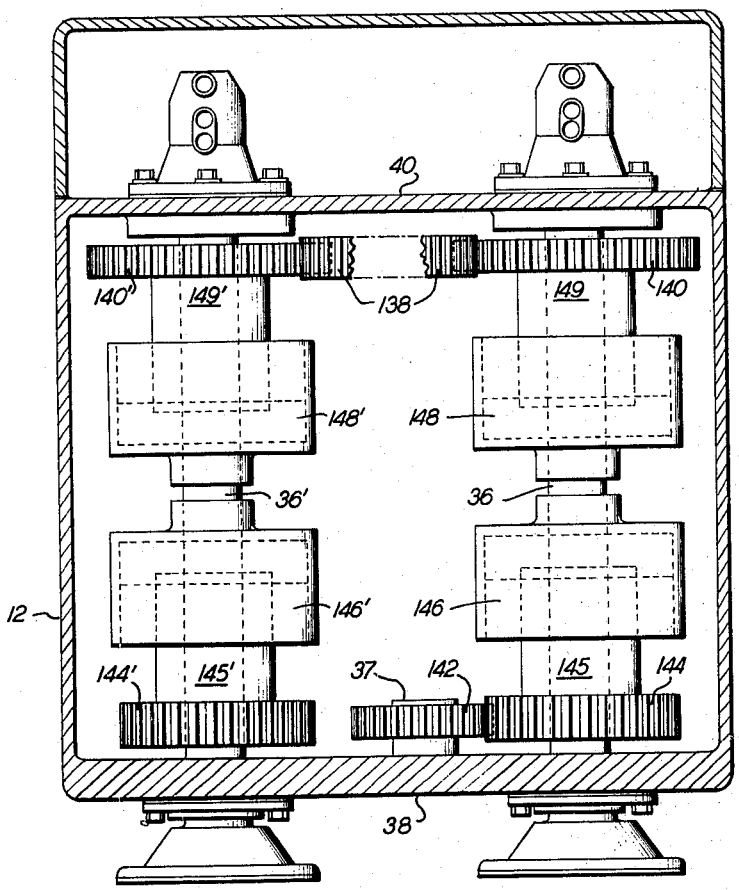
Fig. 4 is a sectional view substantially on line 4—4 of Fig. 2 showing the paired parallel output shafts.

Referring to the drawings and in particular Figs. 1 through 4, there is shown an improved transmission 10 having a housing 12 which rotatably supports therein plural parallel shafting, change speed and reverse gearing and plural pressure fluid actuated friction clutches for selectively coupling certain change speed and reverse gears to their respective shafts.

The shafting of the transmission 10 includes an input and change speed shaft 30; a first intermediate shaft 32; second intermediate and final change speed shaft 34; a pair of output and reversing shafts 36 and 36'; and a pair of reversing pinion shafts 37 and 37'.

Shafts 30, 32, 34, 36 and 36' are rotatably mounted in conventional bearing means in the rear wall 38 and the front wall 40 of the housing 12 while the pinion shafts 37 and 37' are secured in the rear wall 38.

Transmission input shaft 30 has a gear 44 mounted for relative rotation thereon by bearing means 46. A second gear 48 is also mounted for relative rotation on shaft 30 by bearing means 50. A dual pressure fluid actuated clutching means 52 is nonrotatably mounted on shaft 30. Dual clutch means 52 comprises a clutch assembly 54 for gear 44 and a clutch assembly 54' for gear 48. Clutch assemblies 54 and 54' are respectively provided with cylinders 56 and 58 which contain respectively fluid pressure actuated pistons 60 and 62. When piston 60 is actuated it axially urges into frictional engagement clutch discs 64, which are splined to clutch means outer shell 68, and clutch discs 70, which are splined to shank 74 of gear 44, against stop 76 which is held in place in outer sleeve 68 by snap ring 78. This effectively clutches input shaft 30 to gear 44. In like manner when piston 62 is actuated clutch discs 64', splined to clutch means shell 68, and clutch discs 70', splined to shank 74' of gear 48, are urged together against stop member 76' which is held in place in shell 68 by snap ring 78'. This is effective to clutch gear 48 to the input shaft 30. Piston 60 is provided with a spring return means 80 and piston 62 with spring return means 80' for piston return upon cut-off of fluid pressure to the respective cylinder 56 or 58. An internal fluid line connection 82 and pressure fluid line 84, which extends to and through a pressure fluid manifold 86, are provided for pressure fluid control of piston 60. A comparable internal line 88—89 which extends to cylinder chamber 58 is provided for piston 62. A lubrication supply line 90 is also provided which extends from the outside through manifold 86 and the input shaft 30 for lubrication of relatively moving parts on shaft 30.

Annular pistons 60 and 62 for the input shaft clutch means 52 are interconnected by tie rods 61 and cooperating bolts 63 and 65 for common movement as disclosed in co-pending application Serial No. 803,119, filed March 31, 1959, by D. M. Schwartz et al.

Interconnecting pistons 60 and 62 by tie means 61 insure that at no time are gears 44 and 48 clutched to rotate with input shaft 30 at the same time.

Countershaft or first intermediate shaft 32 has nonrotatably mounted thereon, at the left end, gear 100 which is in continuous mesh with gear 44 of input shaft 30. Toward the right end countershaft 32 nonrotatably mounts gear 102, which is in continuous mesh with gear 48 of input shaft 30, and a third gear 104 is secured to shaft 32 to the right of gear 102. Gear 100 is also in continuous mesh with gear 106, which is mounted for relative rotation on final change speed and second intermediate shaft 34 by bearing means like bearing means 46 for gear 44. Gear 104 of first intermediate shaft 32 is in continuous mesh with a gear 110 which is also mounted for relative rotation on final change speed shaft 34 by suitable bearing means.

Dual clutch means 114 which is nonrotatably fixed to the second intermediate shaft 34 is substantially the same as dual clutch means 52 without the piston tie means 61 and comprises pressure fluid actuated clutch assembly 116 for gear 106 and pressure fluid actuated clutch assembly 116' for gear 110 whereby controlled clutching of gear 106 and gear 110 to shaft 34 is effected. Clutch assembly 116 includes a cylinder having a piston 120 mounted therein which when actuated presses clutch discs splined to clutch means shell 126, and clutch discs splined to shank 132 of gear 106, together against a stop member which is carried by shell 126 as described with reference to clutch assembly 54. In like manner piston 134 in the cylinder of clutch assembly 116' urges cooperating clutch discs into frictional engagement to clutch gear 110 through gear shank 110' to final change speed shaft 34. Pressure fluid control lines like lines 84 and 88 for clutch 52 are provided for directing pressure fluid to the pistons 120 and 134.

The second intermediate shaft 34 has a reverse drive gear 136 nonrotatably mounted thereon at the left end, as viewed in Figs. 1, and 4 through 8 and to the right of gear 110 there is a gear 138 nonrotatably mounted thereon. Gear 138 is in continuous mesh with gears 140 and 140' which are rotatably mounted on dual output shafts 36 and 36' respectively. Gear 136 fixed to shaft 34 is in continuous mesh with reverse idlers 142 and 142' which are rotatably supported by conventional bearing means on reverse idler shafts 37 and 37' respectively. Reversing gear idlers 142 and 142' are in turn in continuous mesh with respective gears 144 and 144' rotatably mounted on respective dual output shafts 36 and 36'.

Pressure fluid actuated friction clutching means 146 is provided for clutching gear 144 to output shaft 36 through gear shank 145 and a pressure fluid actuated friction clutching means 148 is provided for clutching gear 140 through gear shank 149 to output shaft 36. In like manner a clutch means 146' is provided for clutching gear 144' through gear shank 145' to the other output shaft 36' and clutch means 148' is provided for clutching gear 140' through gear shank 149' to output shaft 36'.

Although clutch means 146 is separate from clutch means 148 on output shaft 36 and clutch means 146' is separate from clutch means 148' on output shaft 36', they are structurally the same as the unitary dual clutch means 114 of the shaft 34.

From the foregoing description of the improved transmission, it will be seen that in addition to a neutral position for each of the output shafts 36 and 36', it is possible to drive each of the output shafts 36 and 36' in the forward or reverse direction of rotation in four speed ranges. It will also be appreciated by those skilled in the art that operation of one or both of the output shafts 36 and 36' is at the selection of the operator and further that one of the output shafts may be rotated in one direction of rotation while the other is rotated in the opposite direction of rotation and that the direction of rotation of the dual output shafts 36 and 36' are independently selectable by the operator of the transmission. It will further be appreciated that for a given direction of rotation of the input shaft 30, the output shafts 36 and 36' may be rotated selectively in either direction without changing direction of either of the intermediate shafts 32 or 34 or any of the gears of the gear trains.

These advantages of the transmission of the invention will be more apparent with reference to Figs. 5 through 9 which are schematic views similar to Fig. 1 showing the power path used in various speed ranges and directions of rotation of output shaft 36.

Figure 5:
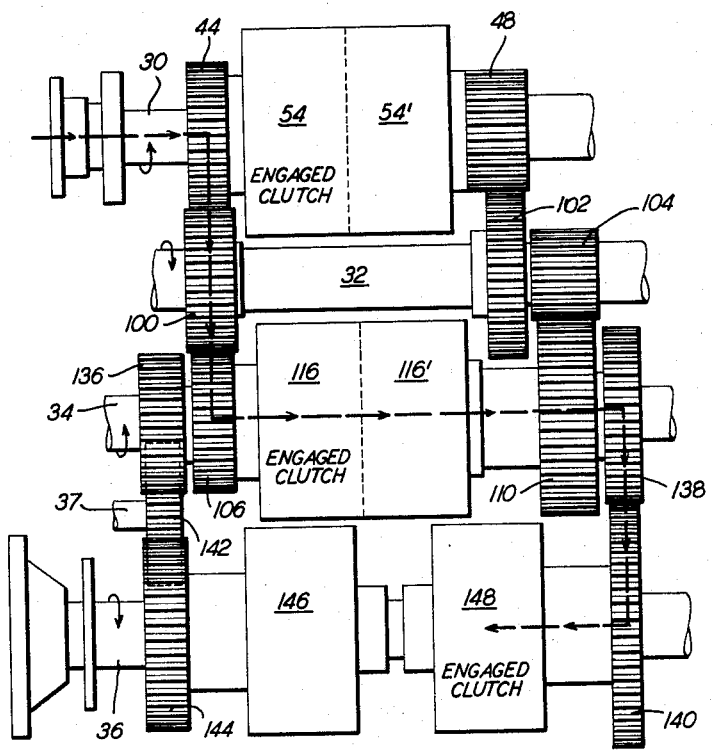
Fig. 5 is a schematic view similar to Fig. 1 illustrating the power path used in the forward drive of one of the dual output shafts in the high speed range.

Referring specifically to Fig. 5, illustrating the power path used in the forward drive of output shaft 36, it will be seen that clutches 54, 116 and 148 are actuated to couple their corresponding gears 44, 106 and 140, respectively, to shafts 30, 34 and 36. With the clutches 54, 116 and 148 actuated, the power flow from the input shaft 30 to the output shaft 36 comprises: input shaft 30 to gear 44 through clutch 54; gear 44 to gear 100 of shaft 32, thence to gear 106 coupled to shaft 34 by clutch 116, thence to gear 138 secured to shaft 34 which gear meshes with gear 140 coupled to shaft 36 by clutch means 148. The direction of rotation of the various shafts in the transmission are indicated by directional arrows, and provides the forward high speed range for the output shaft 36.

Figure 6:
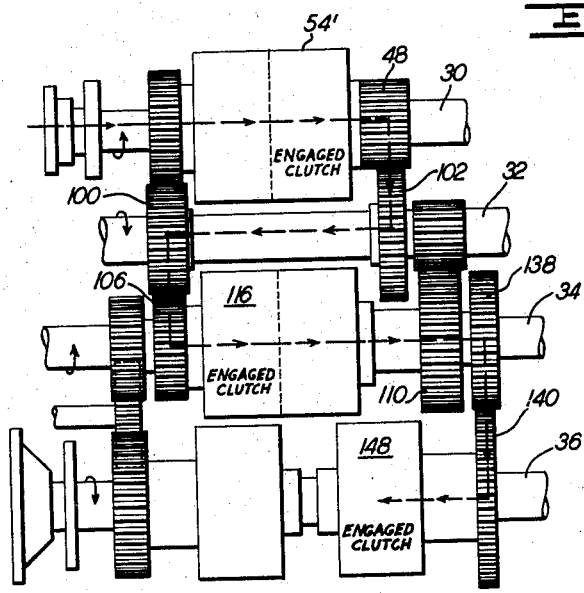
Fig. 6 is a schematic view like Fig. 5 illustrating the power path used in the forward drive of one of the dual output shafts in the third speed range.

Fig. 6 illustrates the power path used in forward drive of output shaft 36 in the third speed range wherein loose gear 48 is coupled to input shaft 30 by actuation of pressure fluid actuated clutch means 54'; loose gear 106 is coupled to the second intermediate shaft 34 by actuation of pressure fluid clutch means 116 and loose gear 140 is coupled to the output shaft 36 by actuation of the pressure fluid clutch means 148.

Figure 7:
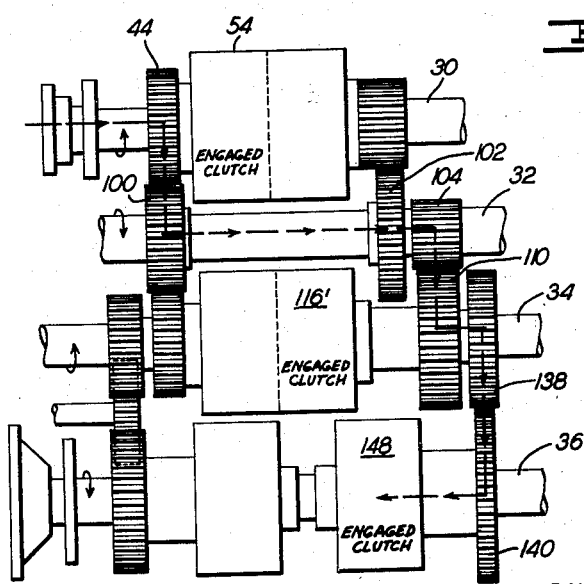
Fig. 7 is a schematic view like Fig. 5 illustrating the power path used in the forward drive of one of the dual output shafts in the second speed range.

In Fig. 7, the power path used in the forward drive of shaft 36 in the second speed range is illustrated. In the illustrated drive arrangement, loose gear 44 is coupled to input shaft 30 by actuation of clutch 54; loose gear 110 is coupled to the second intermediate shaft 34 by actuation of clutch 116' and loose gear 140 is coupled to the output shaft 36 by actuation of clutch 148.

Figure 8:
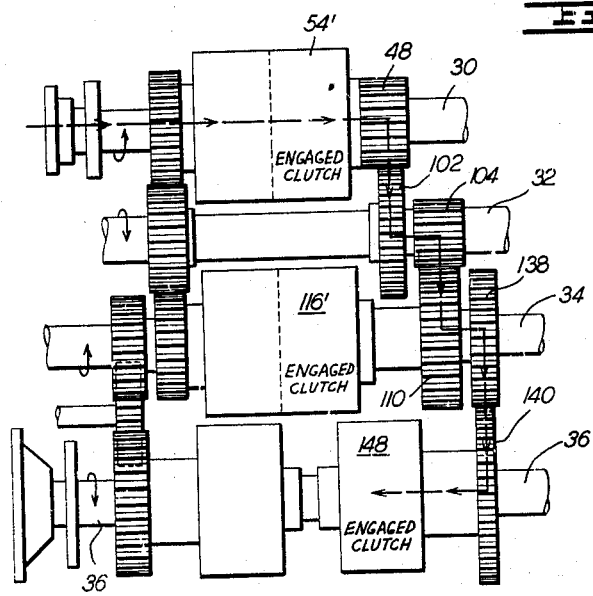
Fig. 8 is a schematic view like Fig. 5 illustrating the power path used in the forward drive of one of the dual output shafts in the low speed range.

Fig. 8 illustrates the power path used in the forward drive of output shaft 36 in the low speed range wherein loose gear 48 is coupled to input shaft 30 by actuation of clutch 54'; loose gear 110 is coupled to the second intermediate shaft 34 by actuation of clutch 116' and loose gear 140 is coupled to the output shaft 36 by actuation of clutch 148.

Figs. 5 through 8 have illustrated the four speed ranges for the forward drive of output shaft 36. The same four speed ranges are available for driving the output shaft 36 in the opposite or reverse direction of rotation by merely coupling loose gear 144 to the output shaft 36 by actuation of the pressure fluid clutch means 146 instead of the actuation of clutch 148 which as illustrated in Figs. 5 through 8 couples loose gear 140 to the output shaft 36. By coupling loose gear 144 to the output shaft 36, then drive from the second intermediate shaft is through fixed gear 136 and reversing pinion 142.

Figure 9:
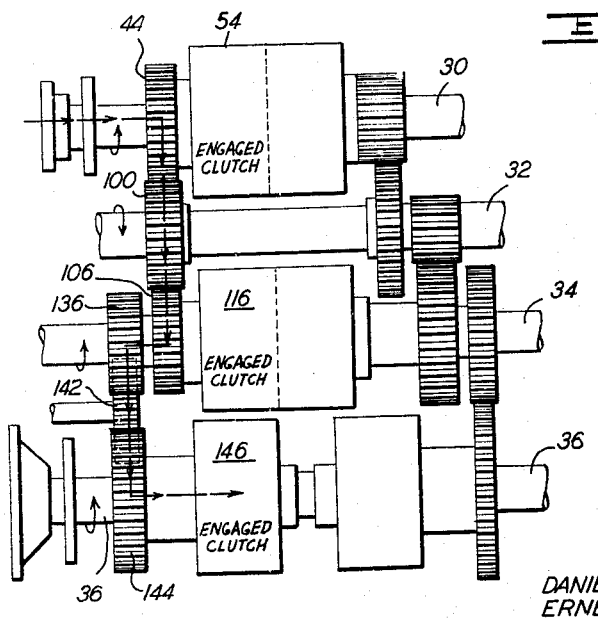
Fig. 9 is a schematic view like Fig. 5 illustrating the power path used in the reverse drive of one of the dual output shafts in high speed range.

Referring specifically to Fig. 9, a reverse direction of rotation of output shaft 36 is illustrated for the high speed range. In the high speed range for reverse direction of rotation of output shaft 36, loose gear 44 is coupled to the input shaft 30 by actuation of clutch 54. Loose gear 106 is coupled to the second intermediate shaft 34 by actuation of clutch 116 and loose gear 144 is coupled to the output shaft 36 by actuation of clutch 146.

Thus, it will be seen that actuation of clutch 54 or clutch 54' determines whether the drive from the input shaft 30 to the first intermediate shaft 32 is through gear 44 or 48. Similarly, actuation of clutch 116 or clutch 116' determines whether drive from the first intermediate shaft 32 to the second intermediate shaft 34 is through gear 106 or 110; and the actuation of clutch 146 or 148 of shaft 36 determines whether shaft 36 is driven by the second intermediate shaft 34 through the forward direction gear 140 or through the reversing gear 144 and reversing gear pinion 142.

The plural pressure fluid actuated clutches 54, 54', 116, 116'; 146, 148, 146' and 148' may be controlled by conventional valve means inserted in pressure fluid conduits between a source of pressure fluid and the clutches or a single valve having plural shiftable valve spools such as disclosed in co-pending application Serial No. 807,698, filed April 20, 1959, K. H. Hoen et al., may be used.

While there has been shown and described an embodiment of the invention, various changes and modifications may be effected therein without departing from the spirit and scope of the invention as defined in the appended claims.

We claim:

1. A transmission including a power input shaft, an output shaft, a plurality of intermediate shafts, means connecting said input shaft with said output shaft through said intermediate shafts in serial succession, said connecting means including change speed gears rotatably mounted on the input shaft, change speed gears fixed on the first in series of the intermediate shafts and meshing with the rotatably mounted gears on the input shaft, change speed gear sets between each of said intermediate shafts, direction changing gear sets between the last in series of said intermediate shafts and said output shaft, and clutch means on at least the input shaft and the output shaft for establishing drive through selected gear means and gear sets.

2. A transmission including a power input shaft, a pair of output shafts, a plurality of intermediate shafts, means connecting said input shaft with said output shafts through said intermediate shafts in serial succession, said connecting means including change speed gears rotatably mounted on the input shaft, change speed gears fixed on the first in series of the intermediate shafts and meshing with the rotatably mounted gears on the input shaft, change speed gear sets between each of the intermediate shafts, direction changing gear sets between the last in series of said intermediate shafts and said pair of output shafts, and clutch means on at least the input shaft and the pair of output shafts for establishing drive through selected gear means and gear sets.

3. The invention defined in claim 2 wherein the clutch means on the output shafts established drive through selected direction changing gear sets.

4. A transmission comprising an input shaft, a pair of intermediate shafts, and a pair of output shafts, means connecting said input shaft with said pair of output shafts through said intermediate shafts in serial succession, said connecting means including, high and low speed gears rotatably mounted on the input shaft, clutch means on said input shaft for selectively coupling said high and low speed gear means to the input shaft, high and low speed gear means fixed on the first in the series of the intermediate shafts, said high and low speed gears on the first in series of said intermediate shafts meshing with the high and low speed gears rotatably mounted on the input shaft, high and low speed gear means rotatably mounted on the second in the series of said intermediate shafts, clutch means for selectively coupling the high and low speed gear means on said second in the series of intermediate shafts, direction changing gear sets connecting each of said pair of output shafts with said second in the series of intermediate shafts, said direction changing gear sets including gears rotatably mounted on each of the output shafts, and clutch means on each of said output shafts for selectively coupling the rotatably mounted gears thereto.

5. A transmission including a power input shaft, a power output shaft, and a plurality of intermediate shafts, means connecting said input shaft with said output shaft through said intermediate shafts in serial succession, said connecting means including cooperating pairs of change speed gears mounted on the input shaft and the first in series of the intermediate shafts, each pair of cooperating change speed gears including one gear fixed to its related shaft, change speed gear sets between each of said intermediate shafts, direction changing gear sets between the last in series of said intermediate shafts and said output shaft, and clutch means on the output shaft cooperating with the direction changing gear sets and further clutch means associated with said cooperating change speed gears for establishing drive from the input shaft to the output shaft through selected gears and gear sets.

6. The invention defined in claim 5 wherein at least one of the cooperating pairs of change speed gears includes one gear fixed to the first in series of the intermediate shafts.

References Cited in the file of this patent

UNITED STATES PATENTS

| | | |
|---|---|---|
| 2,618,164 | Schneider | Nov. 18, 1952 |
| 2,710,546 | De Shave et al. | June 14, 1955 |
| 2,869,382 | Klecker et al. | Jan. 20, 1959 |